United States Patent Office 2,787,600
Patented Apr. 2, 1957

2,787,600
PREPARATION OF A SILICA-ALUMINA CATALYST
Edward A. Hunter and Charles N. Kimberlin, Jr., Baton Rouge, La., assignors to Esso Research and Engineering Company, a corporation of Delaware No Drawing. Application May 20, 1952,
Serial No. 288,952
1 Claim. (Cl. 252—455)

This invention relates to an improvement in the preparation of contact solids and particularly of silica-alumina catalysts useful in cracking of hydrocarbons. These improved contact solids are prepared by mulling silica hydrogel with an alumina hydrosol, followed by drying. The resulting inorganic composite may consist of 20 to 60 weight percent alumina and about 80 to 40 weight percent silica, and is characterized by especially good steam stability and other properties such as high cracking activity.

The silica hydrogel useful in the present invention may be prepared in one of the following or similar well-known ways: (1) By contacting sodium silicate solution with an acid regenerated cation exchange resin and allowing resultant hydrosol to set to a hydrogel; (2) by mixing sodium silicate with an acid such as sulfuric acid, allowing the resultant hydrosol to set to hydrogel and washing to remove electrolytes; (3) by hydrolysis of ethyl silicate; (4) by hydrolysis of silicon tetrachloride, allowing the hydrosol to set to a hydrogel, and washing.

The resulting hydrogel, substantially freed of impurities by washing, if necessary, may contain about 3 to 20 weight percent of silica ($SiO_2$) and about 80 to 97 percent of water.

As an example of a silica hydrogel suitable for use, sodium silicate solution ($Na_2O.3.25\ SiO_2$) of specific gravity 1.21 is mixed with stirring with an equal volume of sulfuric acid of specific gravity 1.19. The clear hydrosol is allowed to set to a hydrogel which is aged for a period of about 24 hours. The hydrogel is then broken into lumps of a size less than about one inch in diameter and washed by percolation with low mineral content water at about 70 to 100° F. For washing about 10 volumes of water per volume of hydrogel are percolated over the hydrogel during the course of about 48 hours. The resulting purified hydrogel comprises about 10% silica by weight and about 90% water. By proper choice of the several variables, similar silica hydrogels may be prepared containing, for instance, 5 to 15% silica.

As an example, the alumina hydrosol may be prepared from an alcoholate as follows: 100 parts by weight of metallic aluminum is mixed with about 1000 to 3000 parts of alcohol in the presence of about 0.001 to 0.01 part of a catalyst such as mercuric chloride. Most of the unsubstituted aliphatic alcohols below $C_{10}$, except methyl alcohol, may be used; however, a water insoluble alcohol such as amyl alcohol or a mixture of the isomeric amyl alcohols is preferred. The aluminum metal reacts with the alcohol to form hydrogen which escapes as a gas and aluminum alcoholate which remains in solution in the excess alcohol or hydrocarbon solvent with which the alcohol may be mixed. When a water-insoluble alcohol is used, preferably a hydrocarbon fraction having a boiling range which includes the boiling range of the alcohol is added to the reaction mixture to aid in maintaining solid aluminum alcoholate in solution and to facilitate alcohol recovery.

The resulting aluminum alcoholate solution is then converted into a hydrosol by adding 10 to 100 parts by weight of glacial acetic acid per 100 parts by weight of metallic aluminum used in the process. The alcoholate solution containing the glacial acetic acid is then rapidly mixed with 3500 to 10,000 parts by weight of water per 100 parts by weight of aluminum metal. The temperature of the water may be in the range of about 60° to 212° F., but is preferably about 150° to 180° F. In place of glacial acetic acid other peptizing agents such as formic acid may be used. A translucent alumina hydrosol containing 2 to 6 weight percent of alumina is thus obtained. Alternatively, one may simply add the glacial acetic acid to the alcoholate solution and mull the acidified solution directly with the silica hydrogel. However, this procedure makes alcohol recovery somewhat more difficult.

Instead of obtaining the alumina hydrosol from an alcoholate, the so-called Patrick technique may be used as described, for instance, in U. S. Patent 2,258,099. This involves reacting aluminum, preferably amalgamated with 0.05 to about 1 weight percent of mercury, or treated with other known accelerating agents such as iodine, with 10 to 100 parts by weight of an aqueous solution of acetic or formic acid of about 1% to 3% acid concentration at a temperature of about 80° to 160° F. The dilute acid solution reacts with a part of the amalgamated aluminum during the course of 10 to 48 hours to produce a hydrosol of alumina containing 1 to 3 or 5 weight percent of alumina depending upon the (1) amount and state of subdivision of the aluminum metal used, (2) the concentration of the acetic or formic acid solution, (3) the temperature, and (4) the time the acid solution is allowed to contact the amalgamated aluminum.

There are also other, less desirable, methods of preparing alumina hydrosols known to those skilled in the art. For example, aluminum salts such as aluminum chloride may be converted into dilute hydrosols by dialysis or by treatment with an anion exchange resin.

The alumina hydrosol produced by any of the above methods is thoroughly commingled by ball-milling or otherwise mechanically mixing with silica hydrogel in amounts to give a product containing about ⅔ to 4 parts by weight of silica per 1 part by weight of alumina on a dry basis. The mixing may be done by means of ball mill, rod mills, kneaders, colloid mills, or other mixing and homogenizing equipment. The time of mixing will depend upon the efficiency of the mixing equipment; for example, 4 to 24 hours of ball-milling has been found to be ample. Alternatively the mixture may be ball-milled for about one hour and then passed through a colloid mill. Due to its thixotropic nature the silica hydrogel reverts to a hydrosol during the mulling and mixing operation. If desired, this reversion may be aided and hastened by adding ammonia to raise the pH of the mixture to about 7 to 9. Also, if desired, the silica hydrogel alone may be given a preliminary mulling treatment of one to four hours to bring about a reversion to the hydrosol state before adding the alumina hydrosol. After thorough mixing the mixture is preferably dried by atomizing into a stream of heated air in the temperature range of 400° to 1200° F. to produce microspheroidal particles in the size range of about 20 to 400 microns for use as a catalyst for "Fluid" cracking. In place of spray drying the mixture may be dried in ovens or rotary driers at a temperature of about 250° F. to 500° F. The dried catalyst may then be ground to a particle size useful in the fluid catalytic cracking process or it may be formed into granules or pellets by well-known means for use in fixed or moving bed catalytic cracking processes.

The improved process and product are particularly illustrated in the following specific examples. However, it is to be understood that the present invention is not limited thereto and that numerous variations and modifications can be made therein within the scope of this invention and without departing from the spirit hereof.

EXAMPLE 1

For the preparation of an alumina hydrosol 700 grams of aluminum turnings are amalgamated by covering with about 2 liters of 1% acetic acid solution containing about 15 grams of mercuric acetate. After about 1 hour the amalgamating solution is decanted and the amalgamated aluminum is covered with 38 liters of 1% acetic acid solution. The mixture is maintained at about 120° F. for 20 hours. The resulting alumina hydrosol containing 3.2% by weight of alumina is decanted from the unreacted amalgamated aluminum.

For the preparation of silica hydrogel 15 liters of sodium silicate (Na₂O.3.25 SiO₂) solution of specific gravity 1.21 is slowly added with stirring to 15 liters of sulfuric acid solution of specific gravity 1.19 at a temperature of about 60° F. The mixture is allowed to stand for 24 hours. The hydrogel is broken into lumps and washed with distilled water till free of sulfate ions. The washed silica hydrogel contained about 10% SiO₂.

The silica hydrogel and alumina hydrosol are mixed in the proportions of 25 lbs. of silica hydrogel to 25.2 liters of alumina hydrosol. The mixing is done by ball milling for a period of 24 hours. The ball mill is about ⅓ filled with flint grinding pebbles of about one inch in diameter. After ball-milling the mixture is dried at about 250° F. The dried catalyst is pelleted into $\frac{3}{16}''$ x $\frac{3}{16}''$ cylindrical pellets and activated by heating for 16 hours at 1000° F. before testing for catalytic cracking. The catalyst contains 36.2% Al₂O₃ and 63.8% SiO₂ by weight.

For comparison, and to show the advantage of using alumina hydrosol in place of precipitated gelatinous alumina, a similar catalyst containing 35.3% Al₂O₃ and 64.7% SiO₂ by weight is prepared by mulling washed silica hydrogel with a 5 weight percent aqueous slurry of gelatinous alumina for 24 hours. The slurry of gelatinous alumina is produced by hydrolyzing alumina amylate in the absence of a peptizing agent and separating the regenerated alcohol. After mulling the mixture is then dried, pelleted, and activated as described in Example 1.

The two catalysts are charged to standard test units wherein they form 200 cc. fixed beds. East Texas light gas oil of 33.8° API gravity is cracked over each catalyst at 900° F. at a feed rate of 2 v./v./hr. for a 30 minute period. The data obtained are summarized in Table I.

*Table I*

| No. | Catalyst Type | Conversion of Gas Oil, Vol. Percent |
|---|---|---|
| 1 | SiO₂ hydrogel mulled with Al₂O₃ hydrosol (Invention). | 69.0 |
| 2 | SiO₂ hydrogel mulled with Al₂O₃ slurry | 62.5 |

Separate portions of the two catalysts are steam deactivated by treating with steam at 60 p. s. i. g. and 1050° F. for 24 hours. The steamed catalysts are used to crack East Texas light gas oil at 950° F., 2 v./v./hr. feed rate, for 30 minute periods. The data obtained are summarized in Table II.

*Table II*

| No. | Catalyst Type | Conversion of Gas Oil, Vol. Percent |
|---|---|---|
| 1 | SiO₂ hydrogel mulled with Al₂O₃ hydrosol | 46.3 |
| 2 | SiO₂ hydrogel mulled with Al₂O₃ slurry | 41.2 |

From the above it is apparent that catalyst No. 1 prepared in accordance with the present invention has a very much greater cracking activity and stability toward steam than the catalyst prepared from the hydrous Al₂O₃ slurry. Apart from the manifest advantage of having a catalyst of high initial activity, the superior steam stability of the novel catalyst is particularly desirable inasmuch as such catalysts are necessarily contacted with large amounts of steam in commercial processes, wherein steam is usually employed for stripping, standpipe aeration, etc.

EXAMPLE 2

In another illustration of the invention, an alumina hydrosol is produced by dissolving about 216 grams of aluminum metal in a mixture of 4 liters of mixed isomeric amyl alcohols and 4 liters of petroleum naphtha boiling in the range of 220° F. to 350° F. using about 0.2 gram of mercuric chloride as a catalyst. About 40 grams of glacial acetic acid is added to the aluminum alcoholate solution and the mixture is immediately hydrolyzed by mixing with about 13.6 liters of water at about 180° F. After standing in a quiescent state for about 6 hours most of the regenerated alcohol and hydrocarbon are decanted from the alumina hydrosol. The remainder of the alcohol and hydrocarbon are removed by stripping. The alumina hydrosol thus obtained is mixed by ball milling for about 16 hours with 2.72 kilograms of washed silica hydrogel produced as described in Example 1. After ball milling the mixture is dried at about 250° F., pelleted, and activated at 1000° F. This catalyst comprises about 60% of alumina and 40% of silica by weight. After steaming at 60 p. s. i. g. and 1050° F. for 24 hours this catalyst gives a conversion of about 49% when used to crack East Texas light gas oil at 950° F., 2 v./v./hr. feed rate, and a 30 minute process cycle.

X-ray diffraction data on the catalyst samples indicate that the catalysts prepared from the alumina hydrosol according to this invention are much more amorphous and less crystalline than the conventional catalyst. It is well-known that amorphous catalyst structures give best results in catalytic reactions such as hydrocarbon cracking. It is therefore presumed that the improvement obtained by this invention is due to the highly amorphous composition of the catalyst produced, though the invention is not necessarily restricted to this theory.

Having described the general nature and illustrative examples of this invention, its scope and spirit is particularly defined in the appended claim.

We claim:

A process for preparing cracking catalysts consisting essentially of silica and alumina, which consists in mixing a sufficient amount of a substantially pure silica hydrogel containing about 10% by weight of silica with alumina hydrosol containing about 3.2% by weight of alumina to give a final dried catalyst consisting of 63.8% silica and 36.2% of alumina, mulling the resulting aqueous mixture for about 24 hours in a ball mill to obtain a homogeneous mixture and drying the resulting homogeneous mixture at about 250° F.

References Cited in the file of this patent

UNITED STATES PATENTS

| | | |
|---|---|---|
| 2,229,353 | Thomas | Jan. 21, 1941 |
| 2,285,314 | Thomas | June 2, 1942 |
| 2,504,001 | Connolly | Apr. 11, 1950 |
| 2,636,865 | Kimberlin | Apr. 28, 1953 |